Nov. 7, 1944.  W. H. EMERSON  2,362,058
JIGGERING APPARATUS
Original Filed April 9, 1940  4 Sheets—Sheet 1
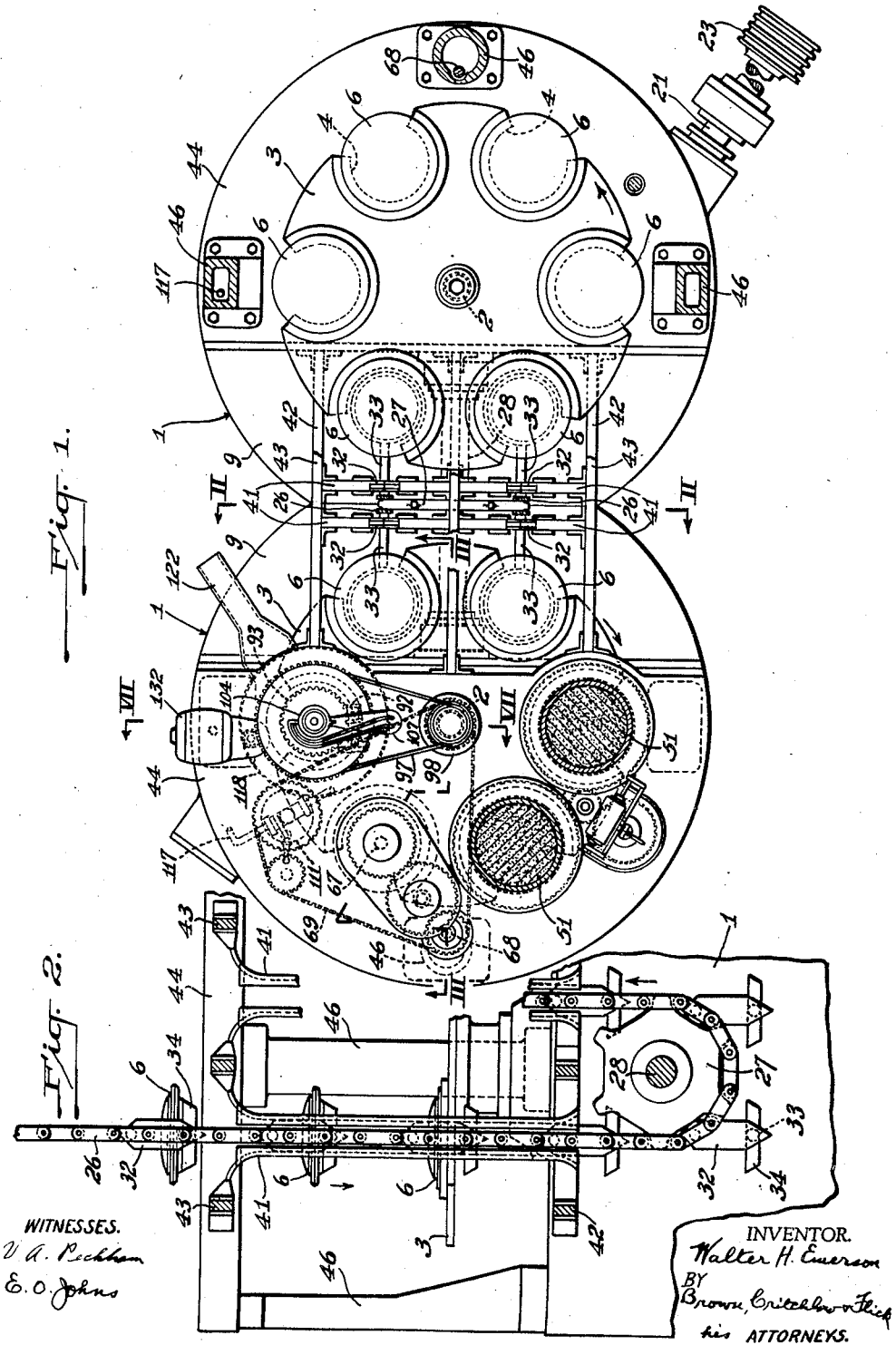
WITNESSES.
V. A. Peckham
E. O. Johns
INVENTOR.
Walter H. Emerson
BY
Brown, Critchlow & Flick
his ATTORNEYS.

Nov. 7, 1944.   W. H. EMERSON   2,362,058
JIGGERING APPARATUS
Original Filed April 9, 1940   4 Sheets-Sheet 2

WITNESSES.

INVENTOR.
Walter H. Emerson
BY Brown, Critchlow & Flick
his ATTORNEYS.

Nov. 7, 1944. W. H. EMERSON 2,362,058
JIGGERING APPARATUS
Original Filed April 9, 1940 4 Sheets-Sheet 3

WITNESSES.
V. A. Peckham
E. O. Johns

INVENTOR.
Walter H. Emerson
BY Brown, Critchlow & Flick
his ATTORNEYS.

Nov. 7, 1944. W. H. EMERSON 2,362,058
JIGGERING APPARATUS
Original Filed April 9, 1940 4 Sheets-Sheet 4

Patented Nov. 7, 1944

2,362,058

UNITED STATES PATENT OFFICE 2,362,058

JIGGERING APPARATUS

Walter H. Emerson, East Liverpool, Ohio, assignor to The Homer Laughlin China Company, Newell, W. Va., a corporation of Delaware Original application April 9, 1940, Serial No. 328,638. Divided and this application May 8, 1943, Serial No. 486,170

14 Claims. (Cl. 25—26)

This invention relates to apparatus for automatically manufacturing dinnerware and the like from plastic material, such as moist clay, and more particularly to apparatus by which plastic material is jiggered on a mold. This application is a division of my copending application, Serial No. 328,638, filed April 9, 1940.

It is among the objects of this invention to provide jiggering apparatus which is fully automatic, which is self-cleaning, which is adjustable for ware of different sizes and shapes, and which sprays with water the ware being jiggered.

In accordance with this invention a horizontal support, such as a rotatable table or its equivalent, is provided with spaced recesses extending vertically therethrough for receiving molds on which articles are to be made from plastic material. Means is provided for indexing the support from one station to another at some of the articles are formed on the molds. Preferably, a blank or bat of plastic material, such as clay, is deposited on a mold at one station, pressed into shape at another, and jiggered at still another station. At the jiggering station the pressed blank is engaged by a rotating profile or jigger tool while a spray of water is applied to the blank. The clay that is trimmed off by the profile is thrown by centrifugal force into a surrounding trough from which it is removed by a mechanical scraper. The profile is mounted on the lower end of a rotating spindle that is adjustable vertically and down through which air and water preferably are delivered to a spray nozzle mounted adjacent the profile. A mold with a blank on it is periodically raised up against the profile and then lowered for lateral movement away from the jigger station to a station at which the mold is removed from the table and carried to a drier.

Figure 3:
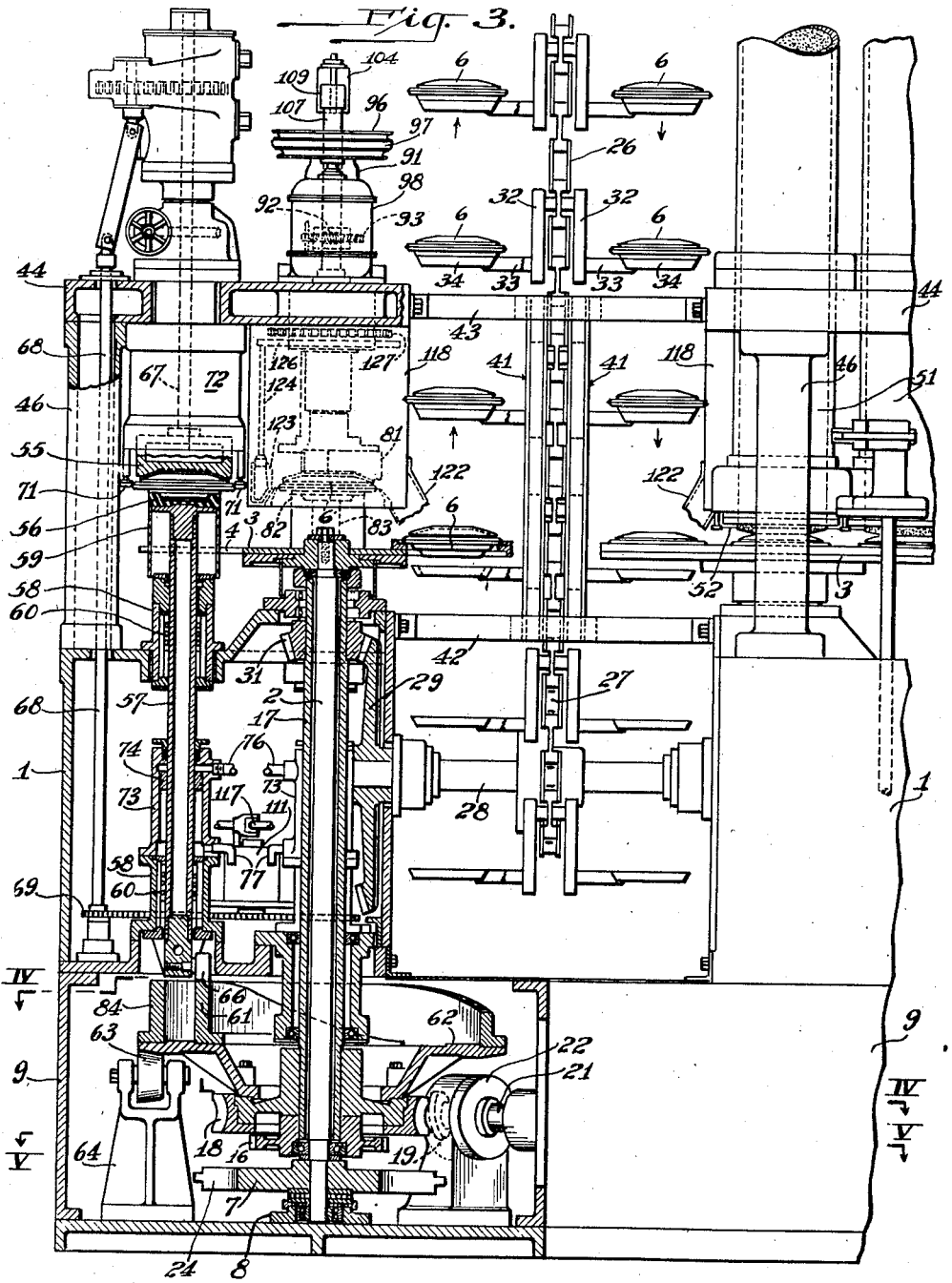
Figure 4:
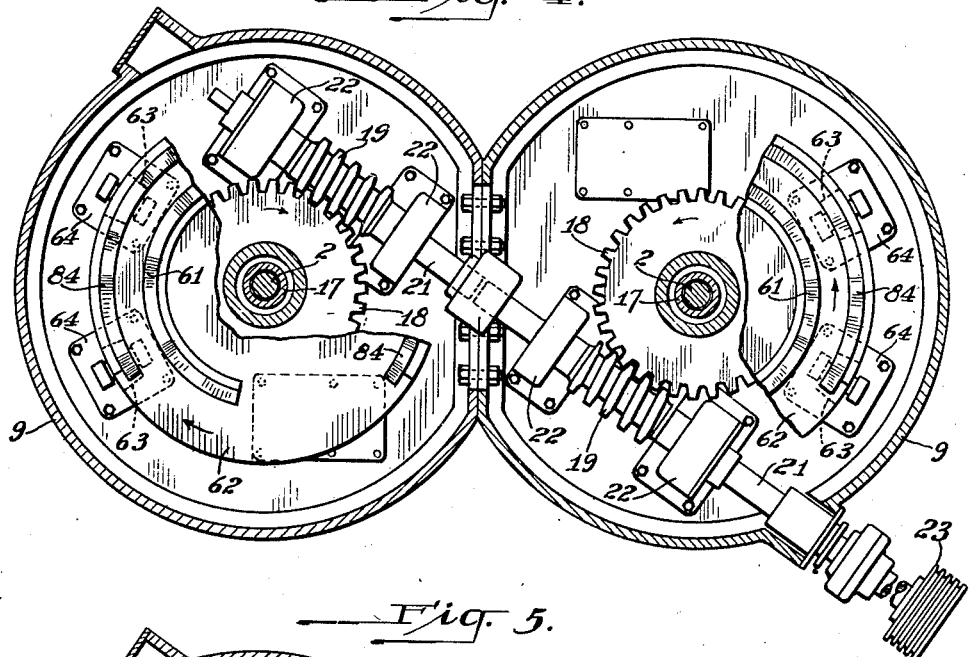
Figure 5:
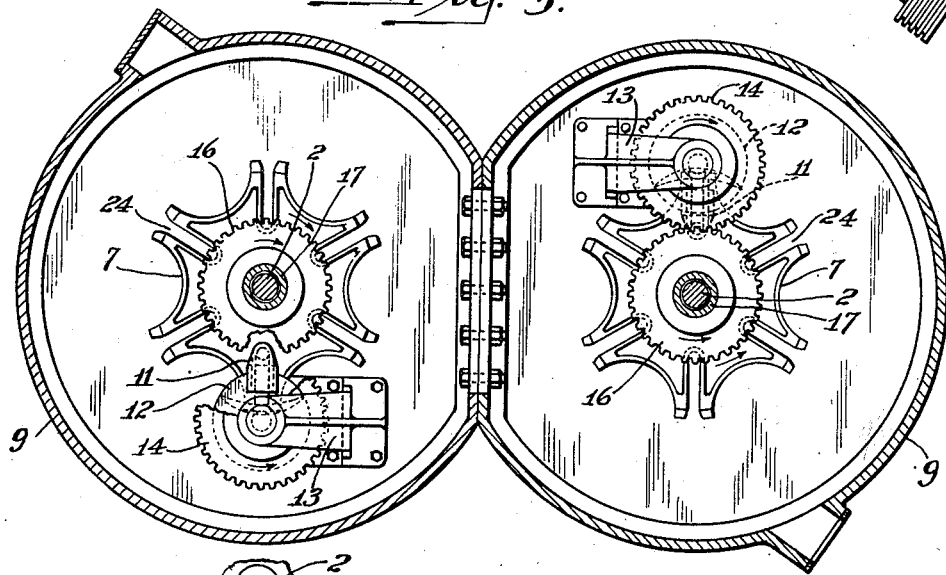
Figure 6:
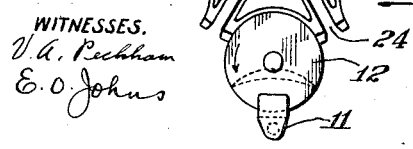
Figure 7:
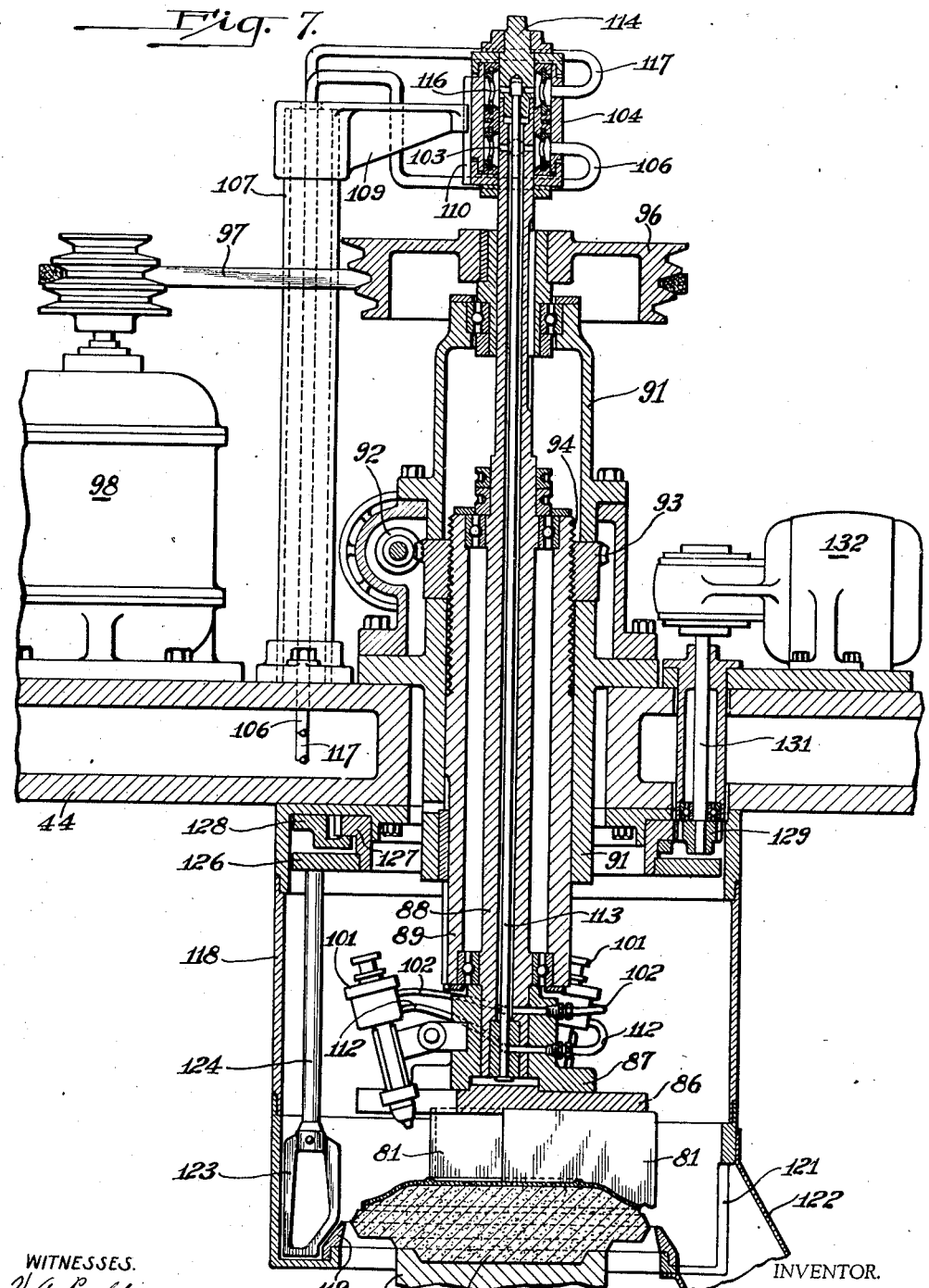

The preferred embodiment of the invention is illustrated in the accompanying drawings, in which Fig. 1 shows two of my machines joined and working together, the left-hand machine being shown in plan and the right-hand one with its top portion removed; Fig. 2 is a fragmentary view taken on the line II—II of Fig. 1; Fig. 3 is a vertical section through one of the machines taken on the irregular line III—III of Fig. 1, the conveyor being shown in elevation; Figs. 4 and 5 are horizontal sections, partly broken away, taken on the lines IV—IV and V—V, respectively, of Fig. 3, but with the indexing mechanism in Fig. 5 shown in its actuating position; Fig. 6 is a fragmentary view of the indexing mechanism of Fig. 5 in its stationary position; and Fig. 7 is an enlarged vertical section through the jiggering apparatus taken on the line VII—VII of Fig. 1.

Referring to Figs. 1 and 2 of the drawings, my machines are connected together in pairs, each unit thus formed comprising a pair of substantially semi-cylindrical housings 1 mounted with their flat side walls opposite each other in spaced parallel relation. A vertical shaft 2 is journaled in each housing adjacent its flat side wall midway between the ends thereof. Rigidly mounted on the upper end of the shaft is a horizontal table 3 provided around its periphery with six circumferentially spaced arcuate recesses 4 of a size adapted to receive the lower portions of molds 6 on which dinnerware, such as plates and saucers and the like, is made. The shaft is indexed or intermittently rotated by a Geneva mechanism including a spider 7 (Figs. 3, 5 and 6) rigidly mounted on its lower end which is journaled in a bearing 8 on the bottom of a sub-housing 9 on which the upper housing 1 is mounted. The two sub-housings of the two adjoining machines are nearly cylindrical with their adjacent flat sides joined together halfway between the two flat inner side walls of the upper housings. The tops of the sub-housings are preferably located at the floor level.

Each Geneva spider is rotated in the usual manner at periodic intervals by means of an arm 11 (Figs. 5 and 6) projecting radially from a horizontal disc 12 which is journaled in a supporting bracket 13 mounted on the bottom of the sub-housing at one side of the spider. The disc is rotated by a gear 14 mounted on its shaft and meshing with a similar gear 16 (Figs. 3 and 5) rigidly mounted on the lower end of a hollow shaft 17 that is rotatably mounted on shaft 2. The hollow shaft is driven by a worm gear 18 thereon (Figs. 3 and 4) from a worm 19 on a horizontal shaft 21 journaled in bearings 22 mounted on the bottom of the sub-housing. As shown in Fig. 4, the two horizontal drive shafts for the two machines are connected end to end and one of them extends through the side wall of its sub-housing and is provided on its outer end with a pulley 23 by which it is driven through belts from an electric motor (not shown). Thus, worm gear 18, hollow shaft 17, and Geneva arm 11 rotate continuously, but the spider and shaft 2 rotate only when the arm enters one of the radial slots 24 in the spider.

Each of the six recesses 4 in each table is indexed to six different circumferentially spaced stations during one revolution of the table, and it is while the recesses are stationary at these stations that the different operations are performed which produce articles of dinnerware on the molds carried by the table. When one of the table recesses is located at the first station, both it and the adjacent recess which is located simultaneously at the last or sixth station, are positioned over the space between the two housings 1, as shown in Fig. 1. When in this position the recess at the first station is adapted to receive a mold on or in which dinnerware is to be formed by the machine, while a mold on or in which dinnerware has been formed at the intervening stations is ready to be removed from the table recess at the sixth station.

To periodically and automatically deposit an empty mold on the table at the first station and remove loaded or ware-carrying molds therefrom at the last station, an endless conveyor is provided. As shown in Figs. 2 and 3, this conveyor comprises an endless chain 26 that extends around and upwardly in parallel vertical strands from a sprocket 27 rigidly mounted midway between housings 1 on a horizontal shaft 28 journaled at its ends in the adjacent flat side walls of the housings. The sprocket shaft is driven from one end by a bevel gear 29 mounted thereon within the adjoining housing and meshing with a bevel pinion 31 rigidly mounted on the upper portion of hollow shaft 17, which, as previously pointed out, is driven continuously. From the ware-forming machine the chain is carried by suitably located sprockets through a drier, such as shown in my Patent No. 2,261,149, in which the ware carried by the molds is dried. Before the dried ware can be carried back to the machines it is removed from the molds manually or by mechanical means, but the molds themselves need never be touched.

As shown in Fig. 3, chain 26 is formed from single straight links pivotally mounted between the ends of double links. Pivotally connected to the central portion of every other single link are the upper ends of a pair of brackets 32 the lower ends of which are provided with arms 33 extending laterally in opposite directions towards the adjacent machines. Rigidly mounted on the outer end of each arm is a horizontal ring 34 in which the lower portion of a mold is adapted to be seated. The downwardly moving strand of the chain carries the rings downwardly through the table recesses at the first station and thereby deposits empty molds on the tables. The empty rings then pass on down and around sprocket 27 and up through the table recesses at the sixth station where they engage and lift loaded molds from the tables and carry them to the drier. As will be seen in Fig. 2, the same mold carrier that deposits a mold on the table at the first station picks up that same mold at the last station, thereby avoiding the possibility of jamming the machine in case one of the mold carriers happens to be missing. By mounting the machines in pairs as shown, one conveyor chain serves two machines.

To prevent the mold carriers from swinging as they pass through the tables, which might cause them to strike the tables and deposit empty molds off-center in their recesses, or result in loaded molds not seating properly in the rings, guides are provided. There are two guides for each strand of the chain, one guide being for the mold carriers for one machine and the other for the carriers for the other machine. Each guide is formed from a pair of laterally spaced upright channels 41 having their flanges facing each other and receiving between them the opposite edges of the carrier brackets 32 which are thereby held steady so that rings 34 can not swing in any direction as they pass through the table recesses. The lower ends of the guides are supported by parallel horizontal bars 42 fastened at their ends to housings 1, and the upper ends of the guides are connected to similar bars 43 fastened to top plates 44 supported above housings 1 by legs 46. To guide brackets 32 into the guides the opposite ends of the brackets are tapered and the opposite ends of the guide channels are curved outwardly, as shown in Fig. 2.

After a mold has been deposited on the table at the first station the table is indexed in the direction of the arrow in Fig. 1 to bring the mold to the second station. At either the second or third station, which are clay-receiving stations, a disc-like blank of clay is deposited on the mold, preferably by the clay feeding apparatus shown in my Patent No. 2,278,513, and in Patent No. 2,313,056, issued to William C. Denison, Jr., and myself. With such apparatus the clay is extruded from the lower end of a vertical tube 51 and discs of clay are periodically cut from the lower end of the clay column by means of a wire 52 that passes transversely therethrough, as shown in the right-hand machine in Fig. 3. There are two of these clay-feeding tubes, and consequently two clay-receiving stations, so that as soon as the clay ceases to emerge from one tube, clay can be extruded from the other one while the first tube is being recharged, thereby avoiding any delay in the clay-feeding operation.

As soon as a mold has received a blank of clay either at the second or the third station, depending upon which clay tube is operating at the time, the charged or loaded mold is indexed on over to the fourth station where the blank is shaped over the mold by pressing apparatus, such as disclosed in my Patent No. 2,310,068, carried by top plate 44. It will be seen in Fig. 3 that a slightly resilient mold chuck 56, which is normally below the table and axially aligned with the pressing die 55 and the mold at the fourth station, is disposed on the upper end of a vertically reciprocable post 57 that is mounted in bearing casings 58 supported by the upper and lower walls of housing 1. The outer surface of the upper bearing casing is cylindrical and telescopically receives a sleeve 59 extending downwardly from the bottom of the chuck. Each bearing casing 58 contains caged ball bearings 60 that space the post therefrom and permit it to reciprocate freely without lateral play which would soon occur if friction bearings were used. The ball bearings are rolled up and down in their casings by the post on which they likewise roll. When a mold on the table is indexed into position above the post and chuck, they then are raised into the position shown in Fig. 3 by a cam 61 (Figs. 3 and 4) mounted on a plate 62 encircling and rigidly connected to hollow shaft 17 in the sub-housing. The marginal portion of the plate is supported on rollers 63 carried in a pair of pedestal bearings 64 mounted on the bottom of the sub-housing. Resting on the cam is a roller 66 carried by post 57 at one side of its lower end.

When the post is raised by the cam, chuck 56 is moved upwardly through the table recess above it where it engages and raises the mold therefrom and presses the clay bat carried by the mold against heated die 55 which is mounted on the lower end of a vertically reciprocable rod
67. This presses the blank over the mold which
shapes the lower surface of the blank while the
die shapes its upper surface. Just before cam
61 starts to recede in order to return the mold
to the table, rod 67 and the die are moved upwardly momentarily by a cam (not shown) which
is actuated by a shaft 68 extending down through
the central hollow leg 46. The lower end of this
shaft is driven continuously by a chain and
sprocket drive 69 from hollow shaft 17. If the
clay tends to stick to the die and follow it upwardly, the edge of the mold strikes against
stripping members 71, depending from the bottom of a cylindrical casing 72 encircling the die,
and thereby the mold is stripped from the die.
The chuck starts to lower the mold before the
die returns to its lower position.

The sub-housing 9 is filled with lubricating oil
which, if allowed to form a film between roller
66 and the cam, would raise post 57 sufficiently
to adversely affect the bat-pressing operation.
To prevent this and also to compel the roller to
follow down the receding cam when the machine
is operating at high speed, means is provided for
positively pressing the cam roller down on cam
61 at all times. This means preferably comprises
a cylinder 73 encircling the post and mounted
on its lower bearing 58, and a piston 74 rigidly
mounted on the post within the cylinder. The
upper end of the cylinder is connected by a pipe
76 to a tank (not shown), in which fluid is maintained under pressure all the time, and the lower
end of the cylinder is connected by a short pipe
77 to the atmosphere. Consequently, the post is
under downward pressure all of the time. When
the post is raised by the cam, piston 74 forces
the fluid above it back into the tank and when
the cam recedes, the pressure of the fluid in the
tank urges the piston down in the cylinder and
thereby holds roller 66 down tight on the receding cam.

After the mold has been redeposited on the
table at the fourth station it is indexed to the
fifth station which is directly below the jiggering
mechanism, as shown in Fig. 3. This mechanism
includes one or more rotating profiles or blades
81 into engagement with the clay on the
mold is moved by a chuck 82 and vertically reciprocable post 83 of the same general construction
and mounted in the same manner as post 57
below the pressing apparatus. This second post
is periodically raised by a cam 84 mounted on
cam plate 62 outwardly beyond cam 61. The jiggering mechanism is shown in enlarged detail in
Fig. 7 in which it will be seen that it extends
vertically through top plate 44 of the machine.

According to this invention, the jigger blade
or blades 81 extend downwardly from the bottom
of a plate 86 fastened to the bottom of a collar
87 which in turn is rigidly mounted on the lower
end of a hollow vertical shaft 88. This shaft is
rotatably mounted in a sleeve 89 that is adjustable vertically in a tubular housing 91 extending
through the machine's top plate 44 to which it is
secured. This vertical adjustment is accomplished by a manually rotatable worm 92 that
meshes with a worm ring gear 93 the inner surface of which is provided with screw threads that
register with threads 94 cut in the upper portion
of sleeve 89. To drive the jigger blades, shaft 88
is rotated by a step pulley 96 mounted on its upper portion and driven by a belt 97 from an electric motor 98 mounted on top of plate 44.

While the ware is being jiggered, it is sprayed
with water from one or more nozzles 101 supported by collar 87 and projecting down through
notches in plate 86. Water is supplied to the
nozzles by hoses 102 communicating with the interior of hollow shaft 88 into the upper end of
which water is introduced through radial passages 103 that open into the lower half of a cylinder 104 in which the upper end of the shaft is
journaled. Water is supplied to the lower half
of this cylinder from a tube 106 that extends
down through a hollow post 107, mounted on top
of plate 44, and out of the machine to a suitable
source of supply. Post 107 has an arm 109 at
its upper end provided at its outer end with a
vertical slot in which is slidably mounted a key
110 fastened to cylinder 104 so that the letter can
move up and down without rotating.

Air is supplied to the nozzles, for atomizing
the water, by means of hoses 112 communicating
with the lower end of a pipe 113 disposed in the
axial bore of hollow shaft 88 and spaced from the
wall thereof. The upper end of this pipe opens
into a plug 114 at the top of the shaft, and the
plug is provided with radial passages 116 that
open into the upper half of cylinder 104 which
is sealed from the lower half. Air is supplied to
this upper half of the cylinder by a tube 117 that
also extends down through hollow post 107 and
into housing 1 where compressed air is admitted
to the tube at predetermined intervals by an adjustable control 111 (Figs. 1 and 3) driven by
chain and sprocket drive 69. The control is preferably of the type shown in my Patent No.
2,241,772.

To confine the water spray and the clay scrapings from the ware being jiggered, the lower end
of the jiggering tool is enclosed by a cylindrical
casing 118 suspended from plate 44. The opening at the bottom of the casing through which
the molds and ware are elevated by chuck 82 is
encircled by an upstanding flange 119 that is
spaced from the wall of the casing to form an
annular trough around the opening. At one
point the outer wall and bottom of this channel
are provided with an opening 121 from which a
chute 122 extends downwardly and outwardly to
a suitable waste receptacle (not shown). The
clay scrapings that collect in this annular trough
are scraped around to opening 121 and the chute
by a rotating scraper blade 123 mounted on the
lower end of a rod 124 extending downwardly
from a ring 126 carried by a ring gear 127. This
gear is rotatably supported by an annular retaining ring 128 and is driven by a pinion 129
on the lower end of a shaft 131 that extends upwardly through plate 44 to a small electric motor
132.

As soon as the ware has been jiggered and returned to the table, the supporting mold is indexed to the last station and lifted from the table
by an upwardly traveling conveyor ring 34 which
carries the mold and ware through the drier and
later returns the empty mold to the table at the
first station. It will thus be seen that this apparatus is entirely automatic and that every operation is performed by mechanical means, from
the time that the clay is charged into the clay-feeding tubes until the dried ware is removed
from the molds after they leave the drier. The
apparatus is so compact that it requires but little
floor space, and its construction is so simple that
there is little to get out of order. Due to the fact
that most of the moving parts rotate or travel in
a cycle in the same direction, there is no appreciable noise or vibration. The different elements of the apparatus can be adjusted so finely that very high grade dinnerware can be manufactured consistently. Finally, the speed at which the machines operate helps to materially decrease the cost of manufacture. For example, they have turned out twenty-four pieces of ware per minute per single machine.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. Jiggering apparatus comprising a support provided with a vertical opening, a vertical sleeve mounted in said opening, means for adjusting the sleeve vertically, a shaft rotatably mounted in said sleeve and projecting from the ends thereof, means for rotating the shaft, a profiling tool carried by the lower end of the shaft, a casing suspended from said support and surrounding the tool and having an open bottom for receiving a clay-covered mold, the casing being formed to catch and collect clay scrap produced by the tool, and means for continuously cleaning said scrap from the casing.

2. Jiggering apparatus comprising a support provided with a vertical opening, an exteriorly threaded sleeve vertically movable in said opening, an annular member encircling said sleeve and threaded thereon, means holding said member against vertical movement, means for rotating said member to adjust the sleeve vertically, a shaft rotatably mounted in said sleeve and projecting from the ends thereof, means for rotating the shaft, a profiling tool carried by the lower end of the shaft, a casing surrounding the lower end of the shaft and having an open bottom for receiving a clay-supporting mold, the bottom of said casing having an inwardly projecting flange for catching scrap removed from said clay, a side wall of the casing being provided with an opening adjacent said flange, and a scraper traveling around the upper surface of said flange for ejecting said clay scrap through said opening.

3. Jiggering apparatus comprising a support provided with a vertical opening, a tubular housing rigidly mounted in said opening, an interiorly threaded ring rotatably supported by said housing, a sleeve vertically adjustable in said housing and having threaded engagement with said ring threads, the periphery of said ring being provided with gear teeth, a manually operable gear meshing with said teeth for turning the ring to adjust the sleeve vertically, a shaft rotatably mounted in said sleeve and projecting from the ends thereof, means for rotating the shaft, and a profiling tool carried by the lower end of the shaft.

4. Jiggering apparatus comprising a support provided with a vertical opening, a vertically adjustable shaft rotatably mounted in said opening, a profile tool carried by the lower end of the shaft, a spray nozzle carried by the lower end of the shaft, said shaft being provided with an axial fluid passage, means connecting the lower end of said passage with said nozzle, a fluid-sealing member mounted on the upper end of the shaft and adapted to connect a source of fluid with the upper end of said passage, the shaft being rotatably mounted in said member, means holding said member against rotation, said member being movable vertically relative to said holding means, a casing surrounding the lower end of the shaft and having an open bottom for receiving a mold, and means for adjusting said shaft vertically relative to the casing.

5. Jiggering apparatus comprising a rotatable hollow vertical shaft, means for rotating said shaft, a profiling tool carried by the lower end of the shaft, an atomizing nozzle carried by the lower end of the shaft, a tube disposed in said shaft and spaced from the inner surface thereof to form a pair of separate passages extending axially within the shaft, fluid-tight means surrounding the upper ends of the shaft and tube and forming a pair of vertically spaced chambers sealed from each other, the shaft opening into one of said chambers and the tube opening into the other, said means being provided with an opening into one of the chambers adapted to be connected to a water supply and being provided with an opening into the other chamber adapted to be connected to a compressed air supply, and conduits connecting the lower ends of said passages with said nozzle.

6. Jiggering apparatus comprising a rotatable hollow vertical shaft, means for rotating said shaft, a profiling tool carried by the lower end of the shaft, an atomizing nozzle carried by the lower end of the shaft, a tube disposed in said shaft and spaced from the inner surface thereof to form a pair of separate passages extending axially within the shaft, the upper end of one of said passages being adapted to be connected with a water supply, the upper end of the other passage being adapted to be connected to a compressed air supply, conduits connecting the lower ends of said passages with said nozzle, a casing surrounding the lower end of the shaft and having an open bottom for receiving a mold, and means for adjusting said shaft vertically relative to the casing.

7. Jiggering apparatus comprising a rotatable hollow vertical shaft, means for rotating said shaft, a profiling tool carried by the lower end of the shaft, an atomizing nozzle carried by the lower end of the shaft, a tube disposed in said shaft and spaced from the inner surface thereof to form a pair of separate passages extending axially within the shaft, fluid-tight means surrounding the upper ends of the shaft and tube and forming a pair of vertically spaced chambers sealed from each other, the shaft opening into one of said chambers and the tube opening into the other, said means being provided with an opening into one of the chambers adapted to be connected to a water supply and being provided with an opening into the other chamber adapted to be connected to a compressed air supply, the shaft being rotatable in said means, stationary means holding said fluid-tight means against rotation, said fluid-tight means being movable vertically, means for adjusting said shaft vertically, and conduits connecting the lower ends of said passages with said nozzle.

8. Jiggering apparatus comprising a support provided with a vertical opening, a vertical sleeve mounted in said opening, means for adjusting the sleeve vertically, a shaft rotatably mounted in said sleeve and projecting from the ends thereof, means for rotating the shaft, a profiling tool carried by the lower end of the shaft, and a casing suspended from said support and surrounding said tool, said casing having an open bottom for receiving a mold.

9. Jiggering apparatus comprising a casing having an open bottom for receiving a stationary clay-supporting mold, a rotatable jiggering tool mounted in the casing for finishing the upper surface of said clay, the bottom of said casing having an inwardly projecting flange for catching scrap removed from said clay, the side wall of the casing being provided with an opening adjacent said flange, a scraper adapted to travel around the upper surface of said flange for ejecting said clay scrap through said opening, and means for driving the scraper.

10. The combination with a horizontal table provided with circumferentially spaced recesses for receiving molds, driving means for indexing the table recesses from station to station, a vertically slidable post adapted to lift a mold from one of said table recesses positioned above the post, and means actuated by said driving means for raising said post when one of said recesses is indexed into position above it, of a casing mounted above said post and having an open bottom for receiving the raised mold, a rotatable jiggering tool mounted in the casing for finishing the upper surface of a blank of plastic material carried by the raised mold, the bottom of said casing having an inwardly projecting flange for catching scrap removed from said blank, the side wall of the casing being provided with an opening adjacent said flange, a rotary scraper adapted to travel around the upper surface of said flange for ejecting said scrap through said opening, and means independent of the mold for driving the scraper.

11. Jiggering apparatus comprising a support provided with a vertical opening, a shaft rotatably mounted in said opening and projecting below the support, a profile mounted on the lower end of the shaft, a casing suspended from said support and encircling said shaft and profile, said casing having an open bottom, means for lifting a clay-covered mold up into the casing for jiggering by said profile, the bottom of the casing having an inside trough encircling the mold for catching scrap removed from said clay, the casing having a discharge opening communicating with the trough, a scraper in the trough, and means supported by said support for moving the scraper around the trough to eject said scrap through said discharge opening.

12. Jiggering apparatus comprising a support provided with a vertical opening, a shaft rotatably mounted in said opening and projecting below the support, a profile mounted on the lower end of the shaft, a casing suspended from said support and encircling said shaft and profile, said casing having an open bottom, means for lifting a clay-covered mold up into the casing for jiggering by said profile, the bottom of the casing having an inside trough encircling the mold for catching scrap removed from said clay, the casing having a discharge opening communicating with the trough, a scraper in the trough, a scraper-supporting member suspended from said support, and means mounted on said support for driving said member around said shaft to carry the scraper around the trough.

13. Jiggering apparatus comprising a support provided with a vertical opening, a shaft rotatably mounted in said opening and projecting below the support, a profile mounted on the lower end of the shaft, a casing suspended from said support and encircling said shaft and profile, said casing having an open bottom, means for lifting a clay-covered mold up into the casing for jiggering by said profile, the bottom of the casing having an inside trough encircling the mold for catching scrap removed from said clay, the casing having a discharge opening communicating with the trough, a scraper in the trough, a ring gear encircling said shaft and rotatably suspended from said support, means connecting the scraper to said gear, an electric motor mounted on said support, and a pinion meshing with said gear and driven by said motor for moving the scraper around said trough.

14. Jiggering apparatus comprising a support provided with a vertical opening, a hollow shaft rotatably mounted in said opening and projecting below the support, a profile tool and a spray nozzle carried by the lower end of the shaft, a conduit connecting the inside of the shaft with the nozzle, means for delivering water to the upper end of the shaft whereby the nozzle sprays water, a casing suspended from said support and surrounding the tool and nozzle and having an open bottom for receiving a clay-covered mold, the casing being formed to catch and collect clay scrap and water produced by the tool and nozzle, and means for continuously cleaning said scrap and water out of the casing.

WALTER H. EMERSON.